United States Patent [19]

Kordts et al.

[11] Patent Number: 4,864,648

[45] Date of Patent: Sep. 5, 1989

[54] METHOD OF TRANSMITTING A GROUP AT LEAST TWO MEASURED VALUES THROUGH AN OPTICAL TRANSMISSION PATH

[75] Inventors: Jürgen Kordts, Wedel; Reiner U. Orlowski, Quickborn; Ingobert H. Gorlt, Tornesch; Gerhard Martens, Henstedt-Ulzburg, all of Fed. Rep. of Germany

[73] Assignee: U.S. Philips Corporation, New York, N.Y.

[21] Appl. No.: 10,035

[22] Filed: Feb. 2, 1987

[30] Foreign Application Priority Data

Feb. 7, 1986 [DE] Fed. Rep. of Germany ....... 3603800

[51] Int. Cl.[4] .............................................. H04B 9/00

[52] U.S. Cl. .......................................... 455/608; 370/4; 375/23; 455/606; 455/612; 455/617

[58] Field of Search ............... 455/608, 612, 606, 617, 455/619; 370/4; 340/825.64; 375/23

[56] References Cited

U.S. PATENT DOCUMENTS

| | | | |
|---|---|---|---|
| 4,525,873 | 6/1985 | Baües | 455/612 |
| 4,525,874 | 6/1985 | Baües | 455/612 |
| 4,694,504 | 9/1987 | Porter et al. | 455/608 |

FOREIGN PATENT DOCUMENTS

| | | |
|---|---|---|
| 0075701 | 4/1983 | European Pat. Off. . |
| 3528416 | of 0000 | Fed. Rep. of Germany . |

*Primary Examiner*—Robert L. Griffin
*Assistant Examiner*—Leslie Van Beek
*Attorney, Agent, or Firm*—Thomas A. Briody; Jack E. Haken; Anne E. Barschall

[57] ABSTRACT

A method of transmitting at least two measured values by means of light pulses which are passed by an optical transmitter through an optical transmission path to an optical receiver and whose relative separation in time is proportional to the measured value. The energy consumption for the optical transmission of the measured values is reduced by transmitting needle pulses cyclically, one after another in the same order of succession, in that per measured value an optical measuring pulse is transmitted, whose separation in time from the optical measuring pulse associated with a preceding measured value is proportional the magnitude of the measured value, and in that for each group of measured values an optical identification pulse is transmitted, whose distance in time from a preceding measuring pulse is smaller than the smallest possible distance in time between two successive optical measuring pulses.

12 Claims, 2 Drawing Sheets

METHOD OF TRANSMITTING A GROUP AT LEAST TWO MEASURED VALUES THROUGH AN OPTICAL TRANSMISSION PATH

BACKGROUND OF THE INVENTION

The invention relates to a method of transmitting measured values by means of light pulses, which are passed by an optical transmitter through an optical transmission path to an optical receiver A method of this kind is known from EP-AL 0075701.

Optical transmission paths and more particularly light wave guides (LWG) are insensitive to electromagnetic radiation interference. They are suitable for use in an environment in which there is a risk of explosion and permit transmission of measured values over a large distance.

It is known to transmit these signals in form of pulse sequences in which the pulse phase is modulated.

For electronically processing the measured values and for forming the optical transmitter pulses, energy from a voltage source is required. In the known case, the required voltage is produced by photo-elements, to which light power is supplied through an optical conductor. Instead, batteries could also be provided in the measuring apparatus. At any rate, it is desirable to keep the energy consumption of the measuring apparatus low.

SUMMARY OF THE INVENTION

Therefore, the invention has for its object to carry out the method of the kind mentioned in the opening paragraph in such a manner that the energy consumption for the optical transmission of the measured values is reduced.

The solution is successful in that the individual measured values of a group of such values are transmitted in the same order of succession directly cyclically after each other, in that an optical measurement pulse is transmitted for each measured value, whose separation in time from the measurement pulse associated with a preceding measured value is a measure of the magnitude of the measured value, and in that for each cycle of measured values an optical identification pulse is transmitted, whose separation in time from a preceding optical measurement pulse is smaller than the smallest possible separation in time between two successive optical measurement pulses.

The invention is based on the recognition of the fact that the major part of the energy required is consumed for forming the optical signals. A considerably smaller amount of energy is required for the pulsatory transmission already considered in the known case as an alternative than for a transmission by means of modulated continuous light. Moreover, the measured data cannot be falsified by variable attenuations of the transmission path in the case of pulse transmission.

Due to the fact that according to the invention only one optical pulse is transmitted per measured value and only one identification pulse is required for a group of measured values, very low energy consumption is obtained, which can be made available by a single lithium battery for the whole life of a measuring apparatus.

The optical transmission path could be a free transmission path. Preferably, however, a single LWG is used, through which the measured values are transmitted successively in time. In the receiver apparatus, one of the measured values is identified by means of the identification pulse.

For the remaining measured pulses, no identification is required because they are transmitted in a constant cyclic order of succession with respect to the identified measured value. According to the invention, no additional transmission time is required for the identification pulse.

If the measured values to be transmitted lie in a range from zero to a maximum value, it is advantageous to transmit two optical measurement pulses one after the other at a relative separation in time $t_o+t_n'$, the constant time $t_o$ being larger than $t_k$ and the time $t_n'$ being dependent upon the measured value. The smallest possible length of the time between successive measurement pulses is always larger than the separation in time between an identification pulse and the preceding measurement pulse so that at the receiver end an unambiguous identification of the identification pulses can always be attained.

A preferred embodiment of the invention is characterized in that the original measured values are converted into electrical square wave signals, whose duration depends in a predetermined manner upon the magnitude of the measured values, in that upon the termination of each square wave signal the beginning of the square wave signal of next measured value is initiated, and in that an identification signal is produced having a constant delay time with respect to the beginning of a square wave signal associated with a predetermined measured value. The square wave signals can then be converted by differentiation stages into needle-shaped pulses, which are supplied as a sum signal through a common conductor to a driver stage of an LED (light emitting diode).

A preferred embodiment of the invention, which requires only a small number of electronic circuit elements, is characterized in that the needle shaped electrical output signals of the optical receiver are converted by a trigger stage after amplification, if desired into square wave pulses, whose duration is longer than the delay time $t_k$ of the identification pulses and is shorter than the difference between a shortest possible measuring time $t_1$ or $t_2$ and the delay time $t_k$, in that these square wave pulses are supplied to a first input of a first AND gate, while the input signal of the trigger stage is supplied to the second input of the first AND gate so that signals having the same phase as the identification pulses are formed at the output of the first AND gate, and in that the inverted output signal of the trigger stage and the input signal of the trigger stage are supplied to a second AND gate, at whose output successive signals are formed in accordance with the separation in time between the measurement pulses.

BRIEF DESCRIPTION OF THE DRAWINGS

In order that the invention may be readily carried out, it will now be described more fully, by way of example, with reference to the accompanying drawing, in which.

DETAILED DESCRIPTION OF THE INVENTION

Figure 1:
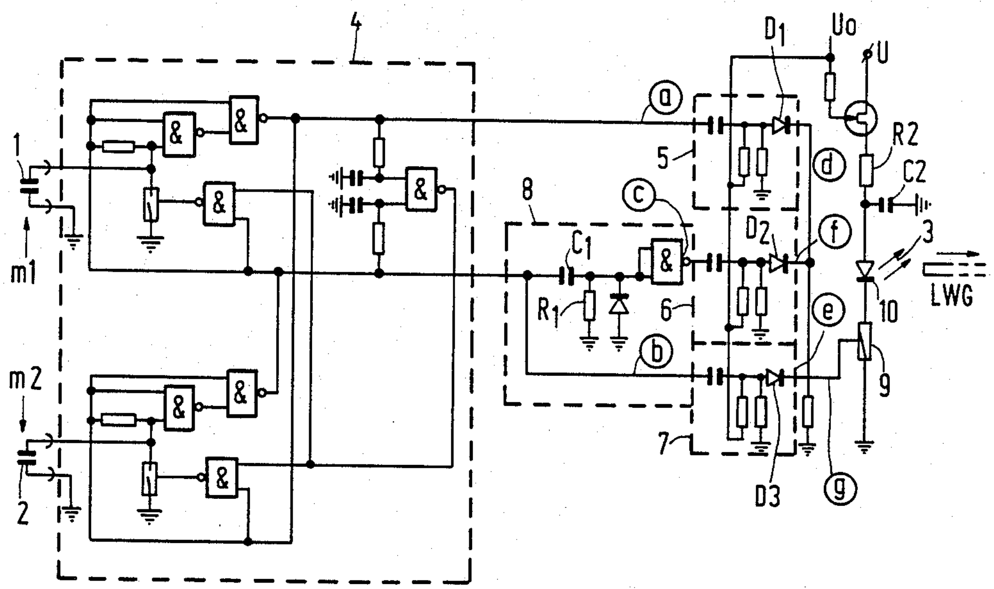
FIG. 1 shows an embodiment of a transmitter a circuit suitable for carrying out the method according to the invention.

By means of the transmitter apparatus shown in FIG. 1, the magnitudes of two measured values m1 and m2 (for example pressure values) are sampled by the capacitive sensors 1 and 2.

Figure 3:
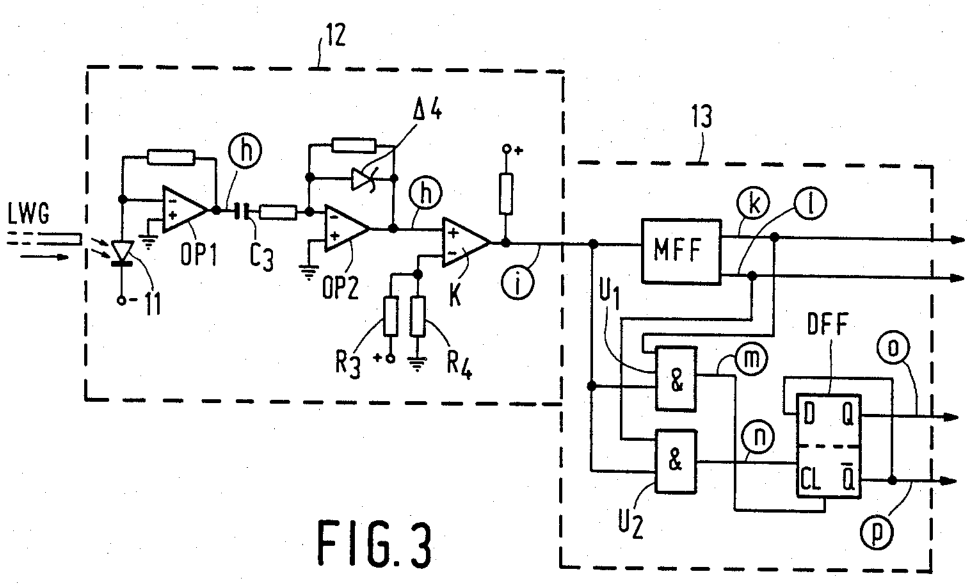
FIG. 3 shows an embodiment of a receiver circuit suitable for carrying out the method according to the invention.

The transmitter apparatus forms from the determined capacitance values of the sensors 1 and 2 optical pulses 3, which are passed into the LWG and are transmitted to the receiver apparatus shown in FIG. 3.

A capacitive pressure sensor consists, for example, of a cylindrical body, at whose end faces are provided metallized diaphragms whose distances from counter electrodes vary with pressure.

The transmitter apparatus comprises an oscillator stage 4, a differentiating and decoding stage comprising the differentiating stages 5, 6 and 7 and a monostable flipflop 8 as well as an optical transmitter stage comprising a light source, which preferably consists of a semiconductor laser diode 10.

Figure 2:
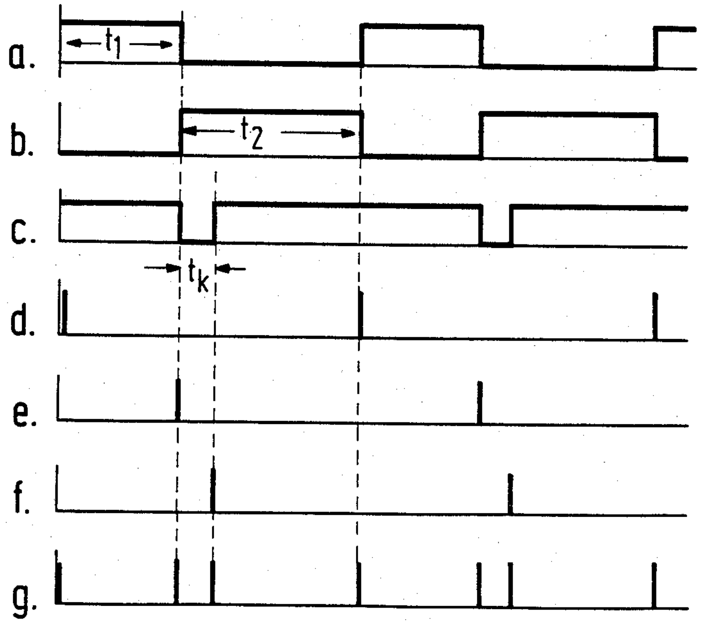
FIG. 2 shows characteristic signals than can be measured at points indicated in FIG. 1.

The oscillator stage 4 produces square wave pulses a and b, as shown in FIG. 2 as a function of time. The length in time $t_1$ of each pulse a contains the information about the value of the capacitance of the sensor 1 and hence about the measured quantity m1. The length in time $t_2$ of the pulse b is correspondingly a measure for the measured value m2.

It is essential that the pulse periods $t_1$ and $t_2$ succeed each other immediately without intervals. This is obtained by means of the oscillator stage 4 through the use of electronic switching means known to those skilled in the art and shown only diagrammatically in the drawing. (Compare German prior Patent Application P 35 28416.1). In this case, interconnected monostable trigger stages are used, each comprising a plurality of AND gate and whose switching state duration depends upon the charging times of the sensor capacitances 1 and 2. The square wave output pulses a and b, respectively, are converted by the differentiation stages 5 and 7, respectively, into needle current pulses (cf. FIG. 2, pulse sequences d and e).

Additionally, a square wave pulse sequence c (FIG. 2) is generated by the monostable flipflop 8 and coupled to the differentiation stage 6, at whose output appears a current pulse sequence f according to FIG. 2. The beginning of the pulses c is delayed by the time $t_k$ with respect to the beginning of the pulses b to be characterized. The delay time $t_k$ is determined by the capacitance $C_1$ and the resistor $R_1$. It must be smaller than the smallest possible value of the times $t_1$ and $t_2$.

In order that measured values that vary between zero and a maximum value measured and transmitted the times $t_1$ and $t_2$ (generally $t_n$) consist of a constant time $t_o$ independent of the measured value plus a variable time$_{1'}$ and $t_{2'}$, respectively, (generally $t_{n'}$) dependent upon the measured value. Therefore: $t_1=t_o+t_1'$ and $t_2=t_o+t_2'$.

With an arbitrary number of measured values to be transmitted, it holds that $t_n=t_n'+t_o$. The time $t_n'$ each time contains the information about the $n^{th}$ measured value.

In the present case, the fixed time $t_o$ is obtained because the capacitances of the sensors 1 and 2 have a finite value when the measured quantities $m_1$ and/or $m_2$ have the value zero.

The diodes $D_1$, $D_2$ and $D_3$ suppress negative signals so that a voltage sum signal as shown at g in FIG. 2 is applied to the control connection of the electronic switch 9 which signal consists of the sum of the needle-shaped signals d, e and f. In the presence of these needle-shaped signals, the light source is connected through the switch 9 to the direct voltage U. Consequently, the light source 10 produces optical needle signals 3, which are supplied in the order of succession in time of the signals g of FIG. 2. The capacitor $C_2$, which had been previously charged through the charging resistor $R_2$, is discharged very rapidly through the light source.

The transient, but large current then flowing through the light source produces an optical pulse. During the long intervals between two successive pulses $C_2$ can then be charged again through $R_2$. The average current consumption is small because the light source is connected only for a short time. The peak current required to produce high optical pulses is then derived from the capacitor $C_2$ for reducing the load of the light source.

While the light source is operated by the uncontrolled voltage of a lithium battery, a voltage constantly controlled by a circuit not shown and designated by $U_o$ is required for supplying the stages 4 to 8 with current. Altogether only an average current of about 30/$\mu$A is required for supplying the whole transmitter apparatus with current.

The optical pulse signals 3 varying according to g of FIG. 2 are passed to the photodiode 11 of the receiver apparatus shown in FIG. 3, which consists of the photo-amplifier 12 and a decoder unit 13 and finally supplies signals o and p (FIG. 4), which correspond to the original signals a and b of FIG. 2. The output signals o and p are supplied together with intermediate signals k and l to an evaluation circuit not shown, to whose output is then supplied, for example, a direct voltage proportional to the difference of the measured values ($m_1$-$m_2$). Such an evaluation circuit can be constructed in a manner known to those skilled in the art, for example as described in German prior Patent Application P 3528416.1. Thus, for example, a pressure difference of a difference pressure sensor can be read directly.

A current-to-voltage converter is connected to the output of the photo-amplifier 12. The photodiode 11 forms from the optical signal an electric current, which then appears at the output of the operational amplifier $OP_1$ as a voltage signal. This signal h is amplified by the operational amplifier $OP_2$. In addition, the direct current signal is separated in this stage by the capacitor $C_3$ in order that the dark current of the photodiode 11 and offset currents of the operational amplifier $OP_1$ have no influence. The signal is limited by the Zener diode $D_4$ in order that any overdrive is avoided. The comparator K then produces a pulse signal i compatible with TTL (cf. FIG. 4). A reference voltage is produced by the resistors $R_3$ and $R_4$. The comparator K changes over when the input signal exceeds the reference signal. Thus, interference signals contained in the signal h that are smaller than the reference signal are suppressed.

Figure 4:
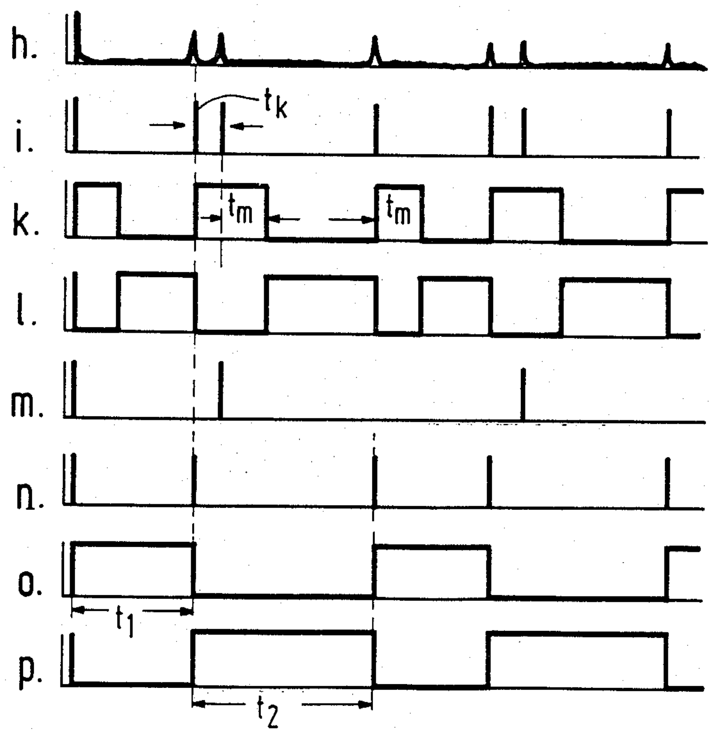
FIG. 4 shows characteristic signals that can be measured at points indicated in FIG. 3.

The output signal in the form of needle pulses generated by comparator K is connected to the decoder circuit 13. The square wave original signal is regenerated from the needle pulses. FIG. 4 shows the pulse diagram of this stage. The monostable flipflop reacts to the trailing edge of the needle pulses i of the comparator K. The pulse time $t_m$ of the monostable flipflop MFF must be longer than the time $t_k$ and shorter than the time $t_2$. The non-inverted output signal of the monostable flipflop MFF is connected to AND gate $U_1$, to which the needle pulse signal is also applied. The gate $U_1$ then ensures that only the identification pulse of the needle pulse signal is passed on. This signal is connected to the reset input of the D flipflop DFF. The inverted output signal of the monostable flipflop MFF is connected to one input of the gate $U_2$. The needle pulse signal appears at its output without the identification pulse. This signal is connected to the "clock" input of the D flipflop, which acts as a bistable trigger circuit and hence is triggered at each needle pulse. A square wave signal then appears at the output Q of the D flipflop, in which the "high level" corresponds to the pulse time $t_1$ and hence with the sensor capacitance $C_1$ and the "low level" corresponds to $C_2$. The perfect association takes place by the identification pulse, which was generated by the gate $U_1$ and is applied to the reset input of the D flipflop D-FF. This pulse appearing in time forces the D flipflop to be reset so that during this time a low level appears at the output Q.

The invention has been explained with reference to the description of a transmission of only two measured values for the sake of simplicity. An advantageous example of application is the pressure difference measurement. It is then advantageous for reducing energy required at the transmitter end not to transmit the value of the pressure difference directly, but to transmit the individual pressure values. The energy required for the electronic conversion and evaluation of the pressure values to the pressure difference value can then be supplied at the receiver end. The circuits shown may be modified in a manner known to those skilled in the art in order to be able to transmit more than two measured values, in which event also only one identification pulse is required.

What is claimed is:

1. A method of transmitting a group of at least two measured values ($m_1$, $m_2$) by means of light pulses which are passed by an optical transmitter through an optical transmission path to an optical receiver, comprising:

cyclically transmitting respective optical measuring pulses for the at least two measured values, so that an optical measuring pulse for a current measured value has a separation in time ($t_1$, $t_2$) from an optical measuring pulse associated with a preceding measured value, which separation in time is a function of the magnitude of the current measured value, and transmitting an identification pulse for identifying the group of measured values whose separation in time ($t_k$) from the optical measuring pulse associated with a preceding measured value is smaller than the smallest possible separation in time between two successive optical measuring pulses, whereby the separation in time ($t_k$) from the preceding optical measuring pulse to the identification pulse is readily distinguishable from the separation in time ($t_1$, $t_2$) between optical measuring pulses.

2. A method as claimed in claim 1 comprising transmitting two optical measuring pulses one after the other at a relative separation in time $t_o+t_n'$, where $t_o$ is a constant time interval longer than the separation in time ($t_k$) from the preceding optical measuring pulse to the identification pulse and $t_n'$ is a time interval which depends on the current measured value.

3. A method as claimed in claim 2, comprising converting the original measured values ($m_1$, $m_2$) into electric square wave signals (a,b), whose duration ($t_1$, $t_2$) depends upon the magnitude of the measured values in a predetermined manner, wherein the termination of each square wave signal a and b, respectively, is contemporaneous with the beginning of the square wave signal (b and a, respectively) of the then measured measurement value, and in that an identification signal (c, f) is produced with a constant delay time ($t_k$) with respect to the beginning of the square wave signal (b) associated with a predetermined measuring signal ($m_2$).

4. A method as claimed in claim 3, comprising converting the square wave signals (a,b,c) into needle pulses (d,e,f).

5. A method as claimed in claim 4, comprising applying the needle pulses (d,e,f) through a common conductor to a driver stage (9) of a semiconductor diode (10).

6. A method as claimed in any one of claims 4 to 5, comprising converting the electrical output signals in the form of needle-shaped pulses of the optical receiver (12) into square wave pulses whose duration ($t_m$) is longer than the delay time ($t_k$) and shorter than the difference between a shortest possible measuring time ($t_1$ or $t_2$) and the delay time ($t_k$), applying the square wave pulses (k) to a first input of a first AND gate ($U_1$), applying the input signal (i) of the trigger stage (MFF) to the other input of the first AND gate, so that signals (m) having the same phase as the identification pulses (f) are obtained at the output of the first AND gate ($U_1$), and applying the inverted output signal (1) and the input signal (i) of the trigger stage (MFF) to a second AND gate ($U_2$), at whose output successive needle signals (n) are obtained in accordance with the separation in time between the measuring pulses.

7. A method as claimed in claim 1, comprising transmitting said optical measuring pulses along a single light wave guide (LWG), at whose beginning a semiconductor laser diode (10) transmits the optical measuring pulses and the identification pulse and passes them to a photodetector (11).

8. The method of claim 1 comprising the step of receiving respective ones of said measured values from a plurality of respective sensors at which said data values are measured.

9. An analog data transmitter for transmitting a plurality of data values as a group comprising:

means for converting said data values into a series of impulses in which the spacing between each pair of successive impulses is a function of a respective one of said data values of said group;

means for generating an identification pulse, for identifying the group, during the time between the impulses corresponding to a predetermined one of said data values; and means for cyclically transmitting said series of impulses and said identification pulse.

10. The data transmitter of claim 9 wherein said identification pulse follows a preceding pulse by a time less than the time corresponding to the smallest possible data value, whereby the spacing in time ($t_k$) from a preceding impulse to the identification pulse is readily distinguishable from a separation in time ($t_1$, $t_2$) between impulses.

11. The data transmitter of claim 9 wherein the data transmitter is an optical data transmitter and the impulses are optical measuring pulses.

12. The data transmitter of claim 9 comprising a plurality of respective means for receiving respective ones of said data values from a plurality of respective sensors at which said data values are measured.

* * * * *